United States Patent [19]

Dinger

[11] Patent Number: 4,507,970
[45] Date of Patent: Apr. 2, 1985

[54] PRESSURE SENSITIVE ELEMENT AND A SENSOR COMPRISING SUCH AN ELEMENT

[75] Inventor: Rudolf Dinger, St-Aubin, Switzerland

[73] Assignee: Asulab S.A., Bienne, Switzerland

[21] Appl. No.: 513,520

[22] Filed: Jul. 13, 1983

[30] Foreign Application Priority Data

Jul. 13, 1982 [FR] France ................................ 82 12532

[51] Int. Cl.$^3$ .......................... G01L 7/00; H01L 41/10
[52] U.S. Cl. ..................................... 73/702; 310/312; 310/370
[58] Field of Search ................... 73/702, 384; 310/312, 310/370

[56] References Cited

U.S. PATENT DOCUMENTS 3,257,850 6/1966 Kooiman ............................... 73/702
3,902,355 9/1975 Weisser ................................. 73/702
4,191,906 3/1980 Kogure ................................ 310/312

Primary Examiner—Donald O. Woodiel
Attorney, Agent, or Firm—Pollock, Vande Sande & Priddy

[57] ABSTRACT

The pressure sensitive element described has an improved barometric coefficient. The sensitive element essentially consists of a piezoelectric tuning fork having a base and a pair of arms. At the end of each arm are provided slots that are parallel to the flanks of the arms. The slots extend all the way through the thickness of the arms. The sensitive element is particularly suited for use in gas pressure measuring sensors.

3 Claims, 6 Drawing Figures

PRESSURE SENSITIVE ELEMENT AND A SENSOR COMPRISING SUCH AN ELEMENT

BACKGROUND OF THE INVENTION

1. Field of the Invention

This invention relates to a pressure sensitive element and to a sensor comprising such an element.

More particularly, the invention is concerned with a device for measuring pressures ranging from a few millibars to at least one bar.

2. Prior Art

For measuring pressures in this range use has first of all been made of pressure gauges (or manometers) involving the deformation of a thin diaphragm by the pressure to be measured. The basic phenomenon is thus mechanical. Firstly, these pressure gauges are bulky and secondly they do not enable a remote reading of the pressure measurements since the link between the deformed diaphragm and the display means is entirely mechanical. In this same pressure range use has also been made of devices which involve piezo-resistive sensor or banks of piezo-resistive sensors. The drawback of such devices is first that they are costly and liable to destruction by overpressure and secondly that they provide an analogical signal which must therefore be converted into digital form to enable subsequent numerical processing. Consequently apparatus involving exhausted chambers mostly are not provided with devices for measuring pressures in this range thereby adversely affecting their operational reliability.

SUMMARY OF THE INVENTION

A main object of the invention is to provide a pressure sensitive element that will be sensitive to pressures ranging from a few millibars to at least one bar, that is capable of good linearity and of good sensitivity, and that in addition is able to deliver information about a pressure measurement in the form of a pseudodigital magnitude or more particularly in the form of a frequency.

The pressure sensitive element provided by the invention comprises a tuning-fork of piezoelectric material having a pair of arms, each arm having a pair of parallel flanks, said tuning-fork being provided with electrodes to vibrate said arms in the flexion mode in a direction substantially at right angles to said flanks, wherein the free end portion of each arm is provided with at least one elongated slot extending parallel to said flanks such that the lateral surfaces thereof will also be substantially at right angles to the direction of motion of said arms, said slot extending right through the thickness of the arms.

With such a tuning-fork a substantial increase may be achieved of the pressure effect in relation to the barometric coefficient of a conventional tuning-fork. Further, the structure of such a tuning-fork lends itself to manufacture by etching and hence to large scale production of the sensitive elements.

A further object of the invention is to provide a sensor for measuring the pressure of a gas, that uses the above defined sensitive element and in which the electronic circuit for processing the signal delivered by the sensitive element is very simple.

This sensor comprises:

a sensitive element as set forth above;

a casing having an opening providing access to the gas whose pressure is to be measured, said tuning-fork being secured inside said casing;

means for applying voltages to said electrodes and for receiving the resonant frequency of the tuning-fork under the effect of said pressure; and means for converting the variations of said frequency into a pressure indication.

BRIEF DESCRIPTION OF THE DRAWINGS

In the accompanying drawings, given by way of example.

DETAILED DESCRIPTION

Figure 1:
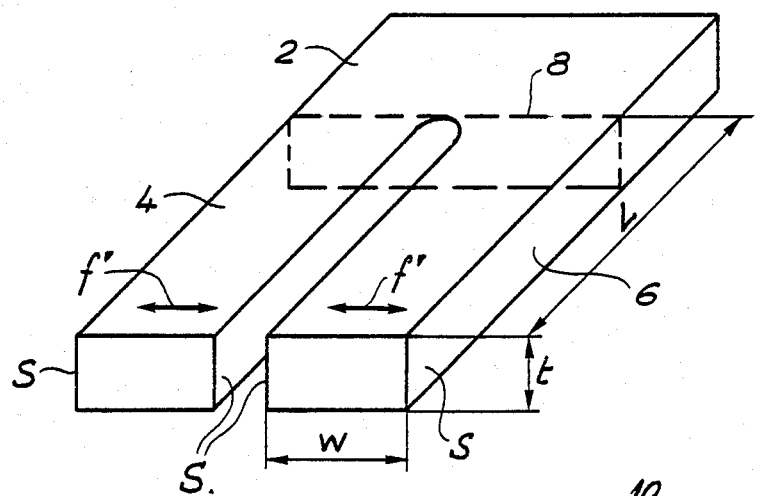
FIG. 1 is a perspective view of a conventional tuning-fork.

The conventional tuning-fork illustrated in FIG. 1 comprises a base 2 and a pair of parallel arms 4 and 6 projecting from the base 2 off plane 8 shown in broken lines. The arms have a length L, a width w and a thickness t, and have flanks S. When such a tuning-fork is excited in flexion, i.e when its arms vibrate as indicated by arrows f', the variation in the resonant frequency $\Delta f$ of the resonator as a function of pressure p is given by the following formula:

$$\frac{\Delta f}{f} = k_1 \cdot \frac{p}{\bar{v}} \cdot \frac{s}{m} \cdot \frac{1}{\omega}$$

In this formula, f is the frequency of vibration of the tuning-fork, $\bar{v}$ is the mean speed of thermal energy of the gas molecules surrounding the tuning-fork, with the gas being at pressure p, s is the area of one of the flanks S, i.e. of one of the surfaces that are at right-angles to the direction of motion, m is the moving mass of the tuning-fork, i.e. the mass of the arms defined by their outer contour and by the plane 8, $\omega$ is the pulsation at resonance, equal to $2\pi f$, f being the frequency, and $k_1$ is a constant.

In view of the above definitions for s and m, these two magnitudes may be expressed as follows: $s = L \times t$ and $m = \rho L \times t \times w$, $\rho$ being the density of quartz.

Substituting for s and m in the previous formula, the following expression is obtained:

$$\frac{\Delta f}{f} = k_2 \cdot \frac{p}{\bar{v}} \cdot \frac{s}{m} \cdot \frac{1}{\omega} , \; k_2 \text{ being a constant.}$$

It will be observed from this formula that the relative variation in frequency as a function of pressure depends, as regards the dimensional magnitudes, solely on the reciprocal of the width w of the arms. The pulsation $\omega$ depends however, as is well known, on the length L and on the width w of the arms.

To increase the tuning-fork sensitivity to pressure, the width w of its arms would therefore have to be reduced to decrease the pulsation ω. Such a solution (narrow tuning-fork arms) would cause the tuning-fork to have a very small dynamic capacitance, rendering such a design unfeasible.

Figure 2A:
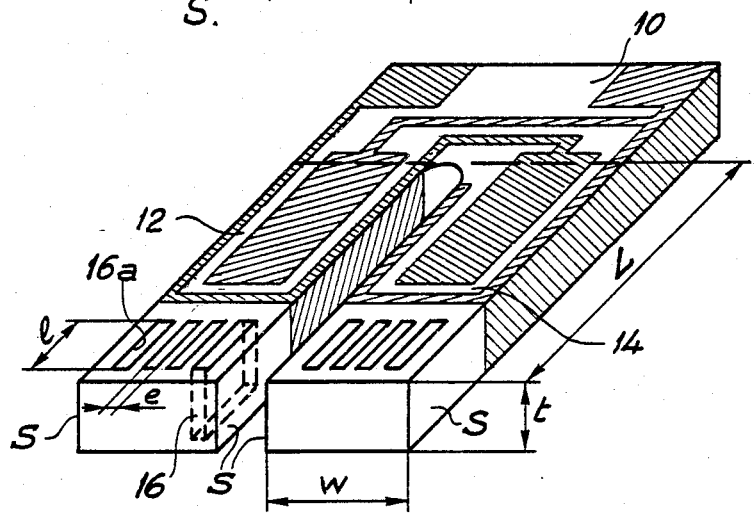
FIG. 2a is a perspective view of a tuning-fork used in a sensitive element according to the invention.

The tuning-fork shown in FIG. 2a has a base 10 and a pair of arms 12 and 14. The free end portions of both arms are formed with elongated slots 16 extending lengthwise of the arms. Here each arm is formed with four slots, each having a length l and a width e. The side surfaces 16a of the slots 16 thus lie parallel to flanks S of the tuning-fork arms that play a part in the measurement of pressure. Further, the width e of the slots is such that its value is clearly greater than the mean free path of the gas molecules. The tuning-fork being excited in flexion, the side surfaces 16a of the slots 16 lie orthogonally to the motion of the arms.

Figure 2B:
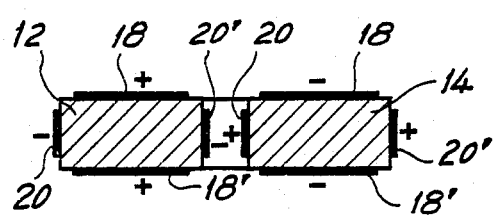
FIG. 2b is a vertical cross-section through the arms of the tuning-fork, showing one way of fitting electrodes to excite the tuning-fork in the flexion mode.

As shown in FIG. 2b, the arms 12 and 14 each have a pair of electrodes 18 and 18' on their top and bottom surfaces, and a pair of side electrodes 20 and 20' on their flanks S. A common potential is applied to each pair of oppositely facing electrodes, as indicated in FIG. 2b.

The presence of the slots does not hinder the deposition of the metallizations forming the electrodes, since, as is well known, the tips of tuning-fork arms must be kept free of electrodes to avoid being excited in partial modes of flexion.

Figure 3:
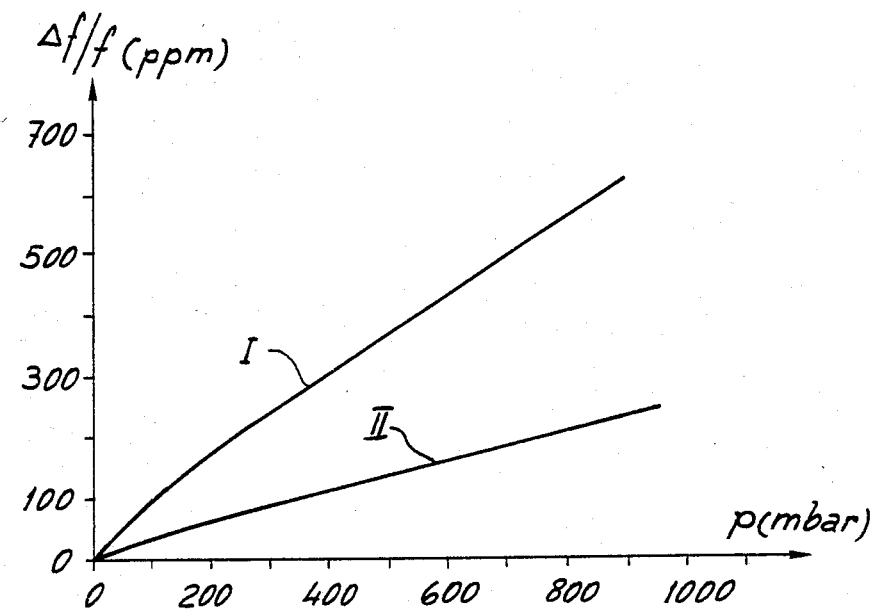
FIG. 3 is a graph illustrating the operation of a sensitive element according to the invention.

Curve I in FIG. 3 illustrates the operation of the tuning-fork shown in FIGS. 2a and 2b. This curve shows the relative variation in frequency $\Delta f/f$, expressed in ppm, as a function of pressure p, expressed in millibars. The arms of the tuning-fork, which is of a size suitable for use in watches, have a length L of the order of 2.7 mm, a width w of 215 µm and a thickness t of 125 µm. Each slot 16 has a length l of 1 mm and a width e of 30 µm. Curve I shows that, in a range of a few millibars to about 1 bar, a very linear relationship is obtained between the relative variation in the tuning-fork frequency and pressure with a pressure coefficient of variation which is about 631 ppm/bar. This value should be compared with the same coefficient for a conventional quartz tuning-fork having similar characteristics but having no slots, which is then of 250 ppm/bar. Curve II corresponds to such a tuning-fork in which L is 2400 µm, w is 220 µm and t is 125 µm. It will thus be observed that a very significant increase may be achieved in the effect of pressure.

Moreover, tuning-forks that are thus produced have a resonant frequency of about 77 kHz. If the length of the tuning-fork arms is increased to reduce the resonant frequency of the tuning-fork to about 32 kHz, the last of the formulae given above shows that the coefficient of dependence with respect to pressure is multiplied by at least two. Thus, with a tuning-fork according to FIGS. 2a and 2b, it is possible to produce, within the range of a few millibars to at least one bar, a pressure sensitive element in which the relative variation in frequency as a function of pressure has a coefficient of about 1200 ppm/bar. Accurate measurements of pressure can thus be made.

Figure 4:
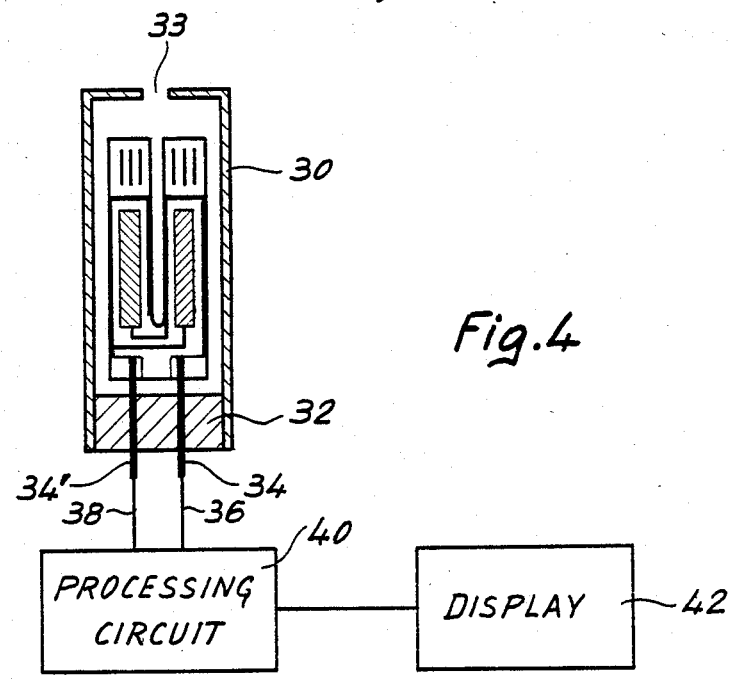
FIG. 4 shows in simplified form a pressure measuring sensor using a sensitive element according to the invention.

The pressure measuring sensor shown in simplified form in FIG. 4 incorporates a sensitive element according to the invention. The sensitive element is enclosed in a casing consisting for instance of a cylindrical sleeve-like brass cover 30 and a support 32 which is at least partially insulating. The cover 30 is provided with an opening 33 to expose the interior of the casing to the pressure having to be measured. Through the support 32 extend two conductive strips 34 and 34' to the inner ends of which is secured the base of the tuning-fork, with each strip being connected to one of two groups of electrodes. The outer ends of the strips 34 and 34' are connected to conductors 36 and 38. The frequency signals appearing on the conductors 36 and 38 are fed into a supply and processing circuit 40 which in turn controls means 42 for displaying the pressure measured by the sensor.

The purpose of the circuit 40 is first to drive the sensitive element at its resonant frequency with due respect to the surrounding pressure and, second, to process the frequency signal so as to deduce from the variations in frequency the value of the pressure.

Figure 5:
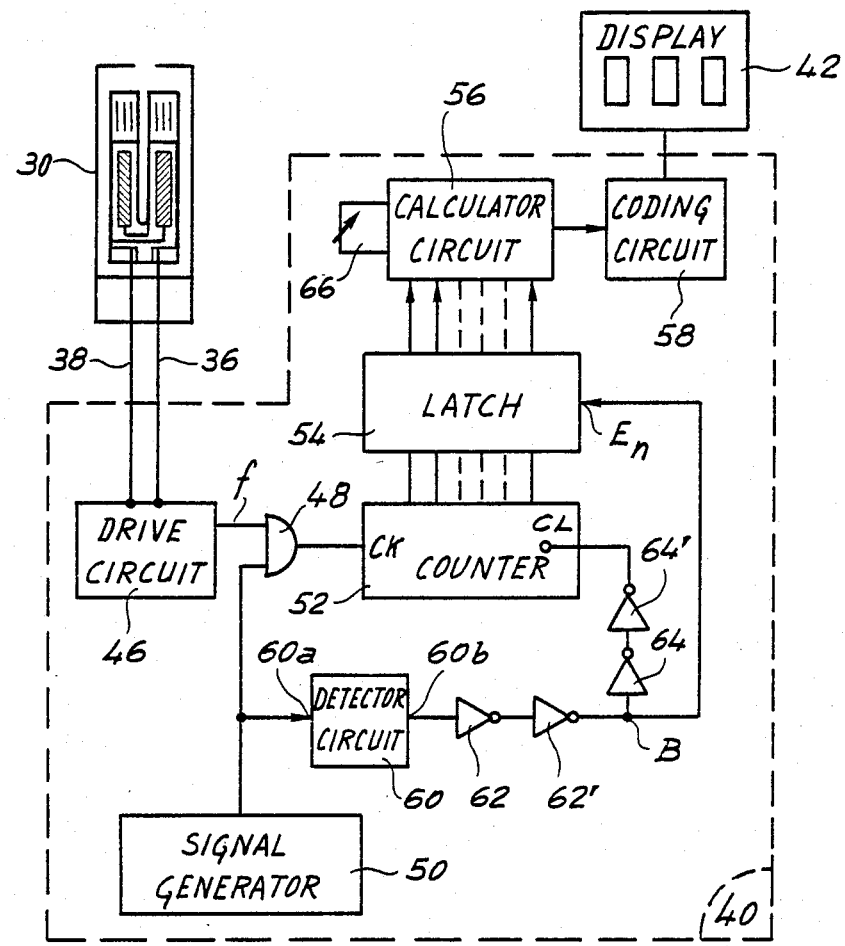
FIG. 5 illustrates a circuit for processing signals delivered by the sensitive element according to FIGS. 2 to 4.

FIG. 5 illustrates one way of designing the circuit 40. The two conductors 36 and 38 are connected to a conventional drive circuit 46 which delivers at its output a signal having a frequency f which depends on the pressure having to be measured. The signal f is applied to one of two inputs of an AND gate 48, the other input of gate 48 receiving a signal supplied by a signal generator 50. The generator 50 delivers for example a signal having a period of 1 second and a duration of 100 milliseconds. The output of gate 48 is connected to the clock input CK of a counter 52. The output signals of the counter 52, which represent the states of the counter, are applied to the inputs of a latch 54. The output signals from the latch 54 are applied to a calculator circuit 56 whose output signals control a coding circuit 58 for the display device 42. The output of the generator 50 is also connected to the input 60a of a detector circuit 60 which delivers at its output 60b a pulse each time the falling edge of a signal is applied to its input 60a. The output 60b of the detector circuit 60 is connected to a point B via a pair of inverters 62 and 62' that act as delay circuits. Point B is connected firstly to the zero resetting input CL of counter 52 via a pair of inverters 64 and 64' that also act as delay circuits and secondly to the enable input E of the latch 54.

The operation of the circuit 40 will be clear from the preceding description. As long as the signal issuing from the generator 50 is in its lower logic state, gate 48 is closed and the counter 52 is not incremented. On receiving from the generator 50 the rising edge of a signal, the gate 48 is opened and the counter 52 receives via its clock input CK the pulses of the signal having a frequency f. When the output of the generator 50 passes from the upper logic state to the lower logic state, the gate 48 is closed and the counter 52 is no longer incremented. At the same time the detector 60 issues a pulse which, with a slight delay, transfers the contents of the counter 52 into the latch 54. Thus, these contents are equal to the number of pulses contained in the signal of frequency f for the duration of the signal delivered by the generator 50, i.e for about 100 ms. The content of the latch 54 accordingly represents in digital form the frequency of the sensitive measuring element. The pulse delivered by the detector 60 then resets the counter 52 to zero for a new measurement on the arrival of the next pulse of the signal delivered by the generator 50. The contents, in binary digital form, of the latch 54 are processed by the calculator circuit 56 to convert this frequency into a number, e.g. millibars. The circuit 56 therefore merely serves to substract a predetermined value, set for instance by regulating means 66, from the number of counted pulses to take into account the value of the frequency at reference pressure, and to divide this result by a fixed or controllable coefficient to provide the ratio between the number of millibars and the variation in frequency. The results of this calculation is applied to the driver 58 which controls the pressure displayed by the display means 42.

As is well known, the frequency delivered by a quartz crystal is dependent on temperature. In the case of a tuning-fork of substantially Z-cut, i.e. wherein the main surfaces are substantially perpendicular to the optical Z-axis of the quartz, the curve which provides the relative frequency variations as a function of temperature is substantially parabolic and its apex corresponds to the inversion temperature on the tuning-fork. It is possible to choose an angle of cut $\theta$ such that this inversion temperature may be centered in relation to the usual operative range of the pressure sensor. For instance, if the normal to the main surfaces of the tuning-fork forms an angle of 2° with respect to the Z-direction of the quartz, the inversion temperature would be 25° C. Under these conditions the relative variation in frequency as a function of temperature are given by the coefficient $\beta$ equal to about $34.10^{-9}/°C.^2$. A comparison of this temperature coefficient with the pressure coefficient obtained as a result of the invention shows that if the temperature remains within a reasonable range on opposite sides of the inversion temperature the effect of temperature does not adversely affect in significant manner the pressure measurement.

The previously given operating range, i.e. from a few millibars to one bar, must not be interpreted in a limiting manner. This corresponds to a satisfactory operation of the tuning-fork such that it does not require very elaborate electronic circuitry. When the pressure p increases, linear sensitivity to pressure remains good but it is the quality factor fo the resonator that deteriorates. It should however be borne mind that the operating range of a sensor using a sensitive element according to the invention may be increased up to 5 bars by adapting the electronic circuitry.

It follows from the preceding description that the pressure sensitive element provides a satisfactory answer to the problem set forth.

First the manufacture of the resonator involves techniques that are commonly resorted to in the production of horological resonators and the requirement for slots does not significantly complicate the etching of the quartz or the provision of the electrodes. Second, the sensitive element will work very satisfactorily in a range of up to one bar, this being a range in which known sensors are unable to carry out remote measurements. Thirdly, bearing in mind the very high sensitivity to pressure, of the sensitive element, it is not necessary to provide for thermal compensation, thus simplifying the structure of the sensor and in particular that of the electronic circuitry.

What is claimed is:

1. A sensitive element for use in a pressure sensor, comprising a tuning-fork of piezoelectric material having a pair of arms, each arm having a pair of parallel flanks, said tuning fork being provided with electrodes to vibrate said arms in the flexion mode in a direction substantially at right angles to said flanks, wherein the free end portion of each arm is provided with at least one elongated slot extending parallel to said flank such that the lateral surfaces thereof will also be substantially at right angles to the direction of motion of said arms, said slot extending right through the thickness of the arms.

2. A sensitive element as in claim 1, wherein the tuning-fork is of quartz and the flanks of the tuning-fork arms are substantially parallel to the Z-direction of the quartz.

3. A sensor for measuring the pressure of a gas, comprising:
   a sensitive element as in claim 1;
   a casing having an opening providing access to the gas whose pressure is to be measured, said tuning-fork being secured inside said casing;
   means for applying voltages to said electrodes and for receiving the resonant frequency of the tuning-fork under the effect of said pressure; and
   means for converting the variations of said frequency into a pressure indication.

* * * * *